(12) United States Patent
Melas

(10) Patent No.: US 10,994,570 B2
(45) Date of Patent: May 4, 2021

(54) METHOD OF MARKING LAMINATED JEWELRY

(71) Applicant: Yianni Melas, New York, NY (US)

(72) Inventor: Yianni Melas, New York, NY (US)

( * ) Notice: Subject to any disclaimer, the term of this patent is extended or adjusted under 35 U.S.C. 154(b) by 783 days.

(21) Appl. No.: 15/608,771

(22) Filed: May 30, 2017

(65) Prior Publication Data

US 2017/0341461 A1 Nov. 30, 2017

Related U.S. Application Data

(60) Provisional application No. 62/342,359, filed on May 27, 2016.

(51) Int. Cl.

| | | |
|---|---|---|
| *B32B 15/01* | (2006.01) | |
| *B44C 1/22* | (2006.01) | |
| *B44C 3/00* | (2006.01) | |
| *B44C 1/00* | (2006.01) | |
| *A44C 27/00* | (2006.01) | |
| *B23K 26/361* | (2014.01) | |

(52) U.S. Cl.
CPC ............ *B44C 3/005* (2013.01); *A44C 27/006* (2013.01); *B23K 26/361* (2015.10); *B32B 15/01* (2013.01); *B44C 1/005* (2013.01); *B44C 1/228* (2013.01)

(58) Field of Classification Search
CPC .... B44C 3/02; B44C 1/22; B44C 3/00; B23K 26/00; B32B 15/01
See application file for complete search history.

(56) References Cited

U.S. PATENT DOCUMENTS 3,959,527 A * 5/1976 Droege ................ A44C 25/001
430/320
4,016,810 A 4/1977 Szikla
(Continued)

FOREIGN PATENT DOCUMENTS

WO 2003099054 12/2003

OTHER PUBLICATIONS

Computerworld: "De Beers and other jewelry industry giants create blockchains to verify gems" (online). Article written May 10, 2018 Retrieved from the Internet: <URL: https://www.computerworld.com/article/3269440/de-beers-and-other-jewelry-industry-giants-create-blockchains-to-verify-gems.html>, pp. 1-6.
(Continued)

*Primary Examiner* — Michael A Laflame, Jr.
(74) *Attorney, Agent, or Firm* — Nolte Lackenbach Siegel

(57) ABSTRACT

A method to permanently mark an item of laminated jewelry involves creating a laminate of two metals, and upper layer typically formed of a more precious metal such as gold, platinum or palladium that do not readily oxidize laminated onto the surface of a less precious metal, such as silver, which can be oxidized to create a dark color (e.g. black). A laser is used to create characters and/or designs in the upper layer by vaporizing portions thereof to effectively remove those portions. This exposes the upper surface of the less precious metal that does become oxidized. An oxidizer, such as liquid sulfur, is then used to blacken the silver, typically a dark gray. However, if more contrast is needed by making the marked text, designs etc. darker than gray a second step can be used by applying an additional oxidizing agent to turn the dark gray to substantially black.

5 Claims, 1 Drawing Sheet

(56) References Cited

U.S. PATENT DOCUMENTS

| | | | |
|---|---|---|---|
| 4,392,476 A | 7/1983 | Gresser | |
| 6,270,122 B1* | 8/2001 | Shadle | B44C 1/145 |
| | | | 116/206 |
| 6,532,725 B1* | 3/2003 | Chia | A44C 11/00 |
| | | | 59/35.1 |
| 6,560,955 B1* | 5/2003 | Chia | A44C 11/00 |
| | | | 59/35.1 |
| 8,985,050 B2* | 3/2015 | Von Gutfeld | C25D 5/34 |
| | | | 118/620 |
| 9,266,370 B2 | 2/2016 | Jung | |
| 2013/0004789 A1 | 1/2013 | Takahashi | |
| 2014/0263667 A1 | 9/2014 | Mege | |
| 2016/0071440 A1* | 3/2016 | Hibbert | B23K 26/38 |
| | | | 40/124.01 |

OTHER PUBLICATIONS

The Diamond Loupe: "Everledger Creating Colored Gemstone Blockchain for Gabelin Gem Lab" (online). Article written Oct. 1, 2018, Retrieved from the Internet: <URL: https://www.thediamondloupe.com/origin-tracking/2018-01-10/everledger-creating-colored-gemstone-blockchain-g%C3%BCbelin-gem-lab.html>, pp. 1-3.

The Journal of Gemmology; Gem Traceability (Article): "Blockchain, Chain of Custody and Trace Elements: An Overview of Tracking and Traceability Opportunities in the Gem Industry". (written in 2018). Retrieved from the Internet: <UTL: https://www.ssef.ch/wp-content/uploads/2018/12/2018-Cartier-et-al-Traceability-Gems.pdf>, pages.

Mining Weekly; "Gemstone mining company Gemfields has again partnered with Swiss gemologist Gübelin Gem Lab to embed nanoparticles proving origin into all Kagem emerald mine emeralds that were sold at auction in Lusaka, in Zambia, in May" (online). Written: Sep. 14, 2018. Retrieved from the Internet: <https://m.miningweekly.com/article/nanoparticle-tech-allows-gemstone-origin-confirmation-2018-08-30/rep_id:3861>, pp. 1-4.

Forbes Article; "The Jewelry industry Prepares for Supply chain Trace-Ability" (online). Oct. 7, 2018, Retrieved from the Internet: <https://www.forbes.com/sites/andreahill/2018/10/07/the-jewelry-industry-prepares-for-supply-chain-trace-ability/#178fba0e5e2e>, pp. 1-6.

The Tracr Vision, "End to end connectivity in the Diamond Industry assures trust" Tracr Website; Oct. 30, 2019, Retrieved from the Internet: https://www.tracr.com>; pp. 1-11.

MicroTrace Solutions "Diamond Provenance", (online), Retrieved from the Internet: https://www.microtracesolutions.com/diamond-provenance, 2019, pp. 1-3.

http://blog.beaducation.com/2010/12/silver-black-prefect-for-oxidizing.html, archived by archive.org in 2011 (year: 2011); 2 pages.

* cited by examiner

METHOD OF MARKING LAMINATED JEWELRY

BACKGROUND OF THE INVENTION

1. Field of the Invention

The invention generally relates to a method of marking metal objects and, more specifically, to a method of imparting text and/or designs on laminated jewelry to maximize contrast, visibility and legibility of the text and/or designs.

2. Description of the Prior Art

U.S. Pat. No. 5,983,238 discloses an identification, tracking and recovery system that includes a central database for electronically storing unique and relevant information of a plurality of gemstones to assist with the recovery of lost or stolen gemstones. The information of each gemstone is stored as a gemstone entry in the database which includes the characteristics of the gemstone, a unique identification number inscribed into a surface of the gemstone by a laser, and personal information of the owner of the gemstone. A user interface enables a user to communicate with a processor which stores and retrieves the relevant information from the database in accordance with an algorithm. The user interface may be located remotely from the database which is located at a central headquarters. The processor is capable of cross-referencing the information of the stored gemstone entry to enable retrieval of a gemstone entry based on any known information, such as the diamond identification number and information pertaining to owner of the gemstone. In addition, the user may flag the gemstone entry of a lost or stolen gemstone to easily identify the status of the ownership of the gemstone and also enable the system. The flagged gemstone entries may then be retrieved to generate a report that lists all of the lost or stolen gemstones stored in the database.

JP2002187398 discloses a surface treating method that comprises the step of forming a masking coating film on at least a part of a non-mirror surface part of a base material having the non-mirror surface part. A pattern on the masking coating film is formed by emitting a laser beam to apply an etching treatment to the base material with the use of a coating film and a mirror polishing process is applied to a region where the etching treatment is applied of the base material to remove the coating film 3. The masking coating film is formed by metal plating or electrodeposition coating. The mirror polishing process is achieved by chemical polishing, mechanical polishing, electrolytic polishing or bright electro-plating.

U.S. Pat. No. 6,476,351 discloses a laser energy microinscribing system, including a semiconductor excited a solid state laser energy source. A cut gemstone mounting system allows optical access to a mounted workpiece. An optical system focuses laser energy from the laser energy source onto a cut gemstone. A displaceable stage is used for moving the gemstone mounting system with respect to the optical system so that the focused laser energy is presented to desired positions on the gemstone. An imaging system is used for viewing the gemstone from a plurality of vantage points and a rigid frame supports the laser. The optical system and the stage are in fixed relation to resist differential movements of the laser and the optical system to increase immunity to vibrational misalignments.

U.S. Pat. No. 8,067,083 discloses an article surface ornamental structure that is easy to work and able to form a decorative pattern. A metal-coated layer is formed by depositing a metal material with metallic luster on a surface of a base material. The metal-coated layer is at least partly provided with a separation part, in which the base material has its surface exposed to create an ornamental pattern due to a difference between the outer appearance of the base material and the metallic luster of the remaining metal-coated layer. With the base material and the metal-coated layer exposed, respectively, each of their surfaces is coated with a clear-coating layer made of synthetic resin material having transmittance in order to protect the surface of the ornamental pattern.

WO2013/074105 discloses a method of laser marking articles. In particular it relates to laser marking articles by laser ablating a coating applied to the article which reveals the surface of the article underneath, thereby forming the mark by the contrasting appearance between the revealed surface of the article and the adjacent remaining coating. Laser parameters are selected to provide uniform, commercially desirable appearance and avoid damage to the underlying surface while maintaining acceptable system throughput. In particular the laser pulse envelope is tailored to provide desirable appearance while maintaining acceptable system throughput.

U.S. Published Patent Application No. 2013/0004789 discloses application on the surface of a multi-layered metal object, from outside to inside, a pattern formed by reaching a lower layer of metal layers. The pattern is formed by removing metal and effectively controlling the pattern part obtained at the end.

When dealing with better jewelry the metals typically used are precious metals such as gold, silver, platinum. However, when using silver alloys the high contrast is not long lasting because both the area being marked and the surrounding area around the laser or mechanical engraving both oxidize equally with time. So both turn black. Thus the entire surface and engraving both oxidize to a black color with time. This does not result in high contrast and the marking becomes lost in the homogenous dark oxidation of the entire piece.

As suggested above, it is known for diamonds to be laser marked for identification on their side called the girdle. After setting the diamond or other gem in jewelry, especially bezel sets, the laser marked identification on the diamond becomes concealed under the metal it is set making the number useless because it can't be seen and is inaccessible. By laser marking the identification of the diamond on the metal part of the jewelry it is set in including all its gem characteristics like origin, weight and carat weight the stone can always be identified without the gem having to be unmounted. It also follows the gem through the jewelry allowing future identification of the gem. This allows the characteristics of the gem to be maintained through the passage of time making it more collectable and valuable. It is a proven fact that rubies from Burma have more value than rubies from Thailand because in the eyes of the collector, Burma is the historical source for some of the world' was no leaves only 2 o'clock in the s best rubies. This is proven by the labs set up around the world like GIA, Gubelin, etc. that issue gem reports that give the origin of the gem based on inclusions and chemical compositions. Auction houses like Sothebys and Christies always sell their valuable gems not only with certificates that the gems are natural but also with accompanying certificates from labs that issue origin reports of the gems origin. Gems with Origin Reports from certain origins have more value and collectability than others.

Certain gems like Rubies from Burma (Myanmar) are boycotted by the U.S. because of the government's human abuse history. By marking the jewelry with the origin of the gem it makes it easier for consumers to know they are not buying gems which come from countries with bad human rights abuses.

By inscribing special gem codes on the jewelry about the gem, it's also easy for the consumer to trace the origin of the gem from mines to market which will also include in some cases the picture of the original rough, who discovered it, who cut it as well as which treatment was used. By maintaining a history of the gem there is more value added to both the gem and the jewelry because the consumer knows the gem is not a conflict gem.

SUMMARY OF THE INVENTION

Accordingly, it is an object of the invention to provide a method of marking laminated jewelry that does not have the disadvantages inherent in prior art methods.

It is another object of the invention to provide a method of marking laminated jewelry that is a simple and economical to use.

It is still another object of the invention to provide a method of marking laminated jewelry that maintains the contrast and visibility of the engraved markings over time.

It is yet another object of the invention to provide a method of marking laminated jewelry that can be used to engrave designs, logos and text.

It is a further object of the invention to provide a method of and marking or imparting text and/or designs on a traditionally less costly precious metal, such as silver, that is gold-laminated with a more costly precious metals, such as gold, platinum or palladium, that comprises an item of jewelry, such as a ring, bracelet, necklace, charm or earrings or the like that mounts a precious stone identified and/or described by the engraved text and/or designs.

To achieve these objects, and others of that will become apparent hereinafter, the method involves creating a laminate of two metals, an upper layer typically formed of a more precious metal such as gold, platinum and palladium that do not readily oxidize laminated onto the surface of a less precious metal, such as silver, which is oxidized to create a dark color (e.g. black). A laser is used to create characters and/or designs in the upper layer by vaporizing portions thereof with a laser to effectively remove those portions. This exposes the upper surface of the less precious metal that does become oxidized. An oxidizer, such as liquid sulfur, is then used to blacken the silver, typically a dark gray. However, if more contrast is needed by making the marked text, designs etc. darker than gray a second step can be used by applying a further oxidizing agent to turn the dark gray to substantially black.

BRIEF DESCRIPTION OF THE DRAWINGS

Those skilled in the art will appreciate the improvements and advantages that derive from the present invention upon reading the following detailed description, claims, and drawings, in which:

DESCRIPTION OF A PREFERRED EMBODIMENT

Figure 1:
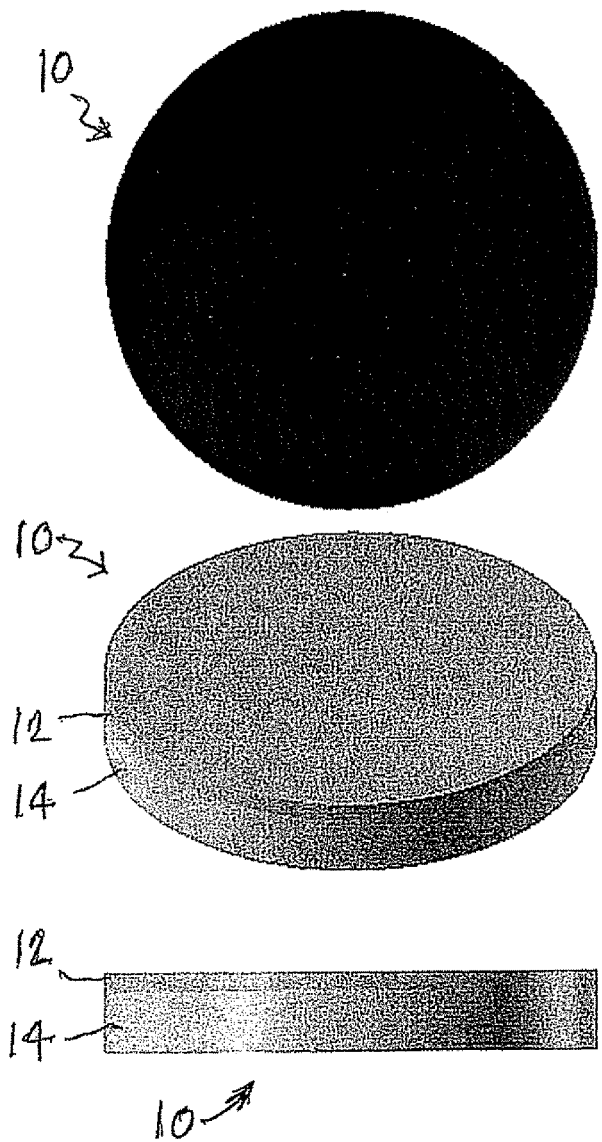
FIG. 1 includes top plan, perspective and side elevational views (from top to bottom) of an exemplary gold-laminated item representing an item of jewelry, such as a charm, prior to engraving in accordance with the invention.

Referring now specifically to the Figures, in which the identical or similar parts are designated by the same reference numerals throughout, and first referring to FIG. 1, an exemplary gold-laminated item representing an item of jewelry, such as a charm, is generally designated by the reference numeral 10. For purposes of this application "laminated" or "gold-laminated" will be defined as any application of a precious metal, such as gold, platinum or palladium over a less precious base material, including silver, by any process including but not limited to, gold overlay, gold filled, gold plated, rolled gold plated (RGP), gold flashed and/or gold washed.

Gold plating is the practice of applying a very thin layer of gold onto the surface of an object through a process called electroplating. It gives the object a gold-like appearance and also renders it more desirable for the gold-like properties.

Gold plating is a common practice especially in today's electronics industry. Semiconductors, circuit boards and audio jacks are just a few of the products people tend to see all the time that use gold plated hardware.

It's especially popular in the jewelry industry because it gives you a product that resembles gold, but without the high price.

A few specifications for "Gold Plated":
Gold must be at least 7 millionths of an inch thick.
Gold must be of at least 10 k quality.
Gold Layered A gold layered object is similar to gold plated, but it differs in that there is no Federal standard for "gold layered", so a gold layered object could have as little as 1 millionths of an inch of gold plating on it. That's a super thin layer!

Gold Overlay

An object with gold overlay has a thicker coating that will hold up better over time and is usually more valuable gold plated objects. The technique has been around for thousands of years and used all over the world. It is the process of using heat and pressure to forge a new alloy with base metals, usually brass.

Because nickel is not used in overlay, rings and other jewelry with gold overlay do not irritate the skin like some gold plated jewelry items do.

A few specifications for "Gold Overlay":
The weight of the gold can be less than ½0th the weight of the metal.
A stamp indicating overlay quality must be carried on the object.
Gold Filled Gold overlay and gold filled are similar in that they both use heat and pressure, but they differ for the reasons listed below.

A few specifications for "Gold Filled":
Must have an overlay of at least 10 k gold and weigh at least ½0th of the total weight of the metal.
A stamp indicating filled quality must be carried on the object.

If you have an object that is gold plated and you're looking to sell it to a gold buyer near you, you may be surprised to find out that the gold layer doesn't add any value to your object. On the other hand, if you have an item that is gold filled or overlayed, then you're in better luck.

Vermeil (vermay) is sterling silver that is plated or coated with gold.

Gold overlay is an application of gold over base metal.

Although gold overlay is not as valuable as gold jewelry, these items still offer a good value for the money. The process gives jewelry the luxurious look of gold for a fraction of the cost of crafting with solid gold.

The quality of gold overlay has improved greatly in recent years.

Gold overlay products earned a poor reputation a few decades ago when the gold layer quickly wore off of jewelry. However, jewelers have improved the gold bonding methods, and the layer of gold set on today's pieces is thicker than on earlier jewelry. This jewelry generally will have a gold layer measurement of 1 Micron. The gold won't wear down, even if you wear your favorite goldplated earrings frequently. Also, the gold layer must be at least 10-karat in quality. Any piece of gold overlay jewelry should include a stamp that indicates the gold's karat quality, such as 18 k overlay for 18-karat gold.

Gold plating refers to the process of chemically bonding a gold layer to a base metal through electrolysis.

Gold-plated jewelry has a top layer of gold with a thickness of 0.175 microns or greater. The electroplating process involves placing a metal object in a gold ion solution, then passing an electric current through the solution to make the ions bond to the metal. The result is a quality piece of gold-plated jewelry that has an unmistakable sheen.

Gold-filled jewelry has a metal base with a top layer of gold that was bonded to the metal with heat and pressure.

For jewelry to be considered "gold-filled," the gold content must compose at least 1/20th of the item's total weight. A piece of gold-filled jewelry will include a stamp noting the bonding process; for example, a GF 14 k stamp on a gold-filled bracelet indicates a composition with 14-karat gold.

The term "gold over silver" refers to another form of gold overlay; however, the use of silver as the base metal increases the value. Silver with a layer of yellow gold is the most luxurious of gold overlay jewelry. Previously, these items, especially those made of sterling silver and a plating of 18-karat yellow gold, were called vermeil (ver-may). Today, retailers like to emphasize the use of two precious metals by calling this composition gold over silver.

Identification of Overlay

1. The federal government regulates gold overlay jewelry and expects each object to be stamped. Electroplated gold jewelry on the other hand do not have any regulations nor are they required to bear a stamp. Gold overlay jewelry must have a layer of gold that is 1/20th or 5% of the weight of the article under federal regulations. The article should be marked GF or 1/20th GF. Gold overlay jewelry is a 100 times heavier than electroplated gold jewelry, and this is its distinguishing feature. The jewelry must have the karat of gold stamped on it and marked as 14K gold overlay or 12KRGP.

The laminated item 10 is formed as a laminate of two metals, and upper layer 12, typically formed of a more precious metals such as gold, platinum or palladium that does not readily oxidize laminated or otherwise applied onto the surface of a less precious metals, such as silver 12, which does oxidize to create a darker color (dark gray or black). A laser (not shown) is used to create characters and/or designs in the upper layer 12 by vaporizing portions thereof to effectively remove selected portions. The removal of selected portions of the upper layer 12 exposes the upper surface of the less precious metal 14 that can be oxidized.

There are 2 ways to form two layers for creating a sandwich between a precious metal such as gold and silver which is required for creating high contrast:

1. GOLD OVERLAY—An object with gold overlay has a thicker coating that will hold up better over time vs electroplating and is usually more valuable than gold plated objects. The technique has been around for thousands of years and used all over the world. It is the process of using heat and pressure to forge a new alloy with base metals in this case silver. Gold overlay requires a sheet of gold and a sheet of silver. Both are sandwiched together under high heat and pressure until there is a mechanical bond between the two sheets and they become one. One side being gold and the other is silver. But this process can be accomplished using a sheet of platinum or palladium or other precious metals forged together with silver. That definition would be palladium overlay or platinum overlay describing the outer precious layer bonded to the base sheet of silver.

The advantage of overlay vs electroplating or electroforming is that many precious metals can be mechanically bonded or forged together. Thus, sheets of platinum, palladium and other white metals can be forged or overplayed together.

The technical and legal term of plating 18 karat gold over silver is called Vermeil.

Another name for "Gold Overlay" is "Gold filled."

A few specifications for "Gold Overlay" is that the weight of the gold can be less than 1/20th the weight of the metal.

Gold Filled-Gold Overlay and Gold filled are similar in that they both use heat and pressure to forge them together, but they differ for the reason listed below: Gold filled must have an overlay of at least 10K gold and weigh at least 1/20th of the total weight of the metal.

2. ELECTROPLATING OR ELECTROFORMING: Gold plating refers to the process of chemically bonding a gold layer to a base metal like silver through electrolysis. Gold plated jewelry has a top layer of gold with a thickness of 0.175 microns or greater. The electroplating process involves placing a metal object in a gold ion solution, then passing an electric current through the solution to make the ions bond to the metal.

This method is an electrical deposition of gold ions to silver vs a mechanical or forged bond. The silver sheet is placed in a electroplating solution and through electroplating (electrolysis) or electroforming a layer of gold is molecularly bonded evenly to the silver sheet creating two layers when one side is purposely masked. Depending on the time left in the solution the layer of gold becomes thicker or thinner based on the technical requirements.

The advantage of electroplating or electroforming the area that needs to be engraved for the high contrast patent is there is less metal recycling required vs using big sheets of gold or platinum overlay with silver that requires having the required shape stamped or cut out. Leaving a lot of precious metal with little use. Another advantage of electroplating or electroforming is the molecular bond between the gold and silver is stronger vs the mechanical bond (forged bond) of the precious metal sheet and the silver sheet in overlay and gold filled.

In FIG. 1, the lower layer 14 supports the upper layer 12 that is a more precious metal such as gold, platinum or palladium. A laser may be utilized to remove portions of selected areas by vaporizing them in the upper layer 14 to create recesses 16 to expose the upper surface of the lower layer 14. For example, the gold overlay on silver which can be lasered to expose the silver beneath it. The silver is usually 0.9 mm thick and the gold layer on top 0.1 mm thick.

Figure 2:
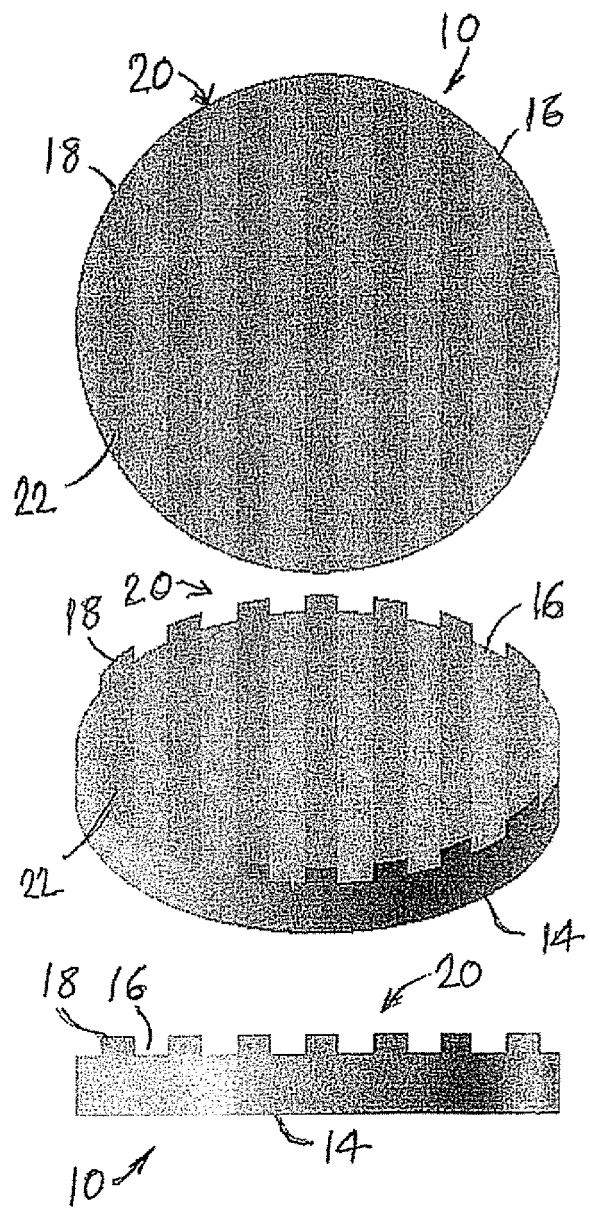
FIG. 2 is similar to FIG. 1, showing the same views of the item of jewelry after it has been engraved with a design.

But it can also be 0.95 mm thick and the gold 0.05 thick. Once the laser burns through the gold layer on top it exposes the silver below. When an oxidizing agent is applied to the top of the engraving the gold doesn't change but the silver oxidizes from silver to black color. The silver can be any thickness but usually is 9/10ths of the entire gold silver sheet. In the illustration shown in FIG. 2 straight laser grooves 16 are shown only to illustrate the method. Clearly, a laser can be used to create complex shapes, text, the characters etc. Once the grooves 16 are created the upper surface of the lower base metal is oxidized in any suitable conventional manner to create the dark areas 22 that are visible through the remaining portions of the upper layer 1. Information can be marked in this manner with the width of the lines 16 being as small as 0.1 mm. It is anticipated that for most practical applications the widths of the removed materials to create text will range between 0.10 mm to 0.2 mm. The thickness of the lower layer of the silver can be approximately 0.9 mm although, clearly, the thickness of the lower layer can be any suitable thickness as it does not directly influence the features and benefits of the invention. The printed characters may or may not be visible to the naked eye although, clearly, the characters, letters or other information can be made as large as desired that would then be visible to the naked eye.

Gold, platinum and palladium do not oxidize when exposed over long periods of time or exposed to corrosive materials such as a sulfur. However, sulfur causes relatively quick reaction in silver and oxidizes the silver to make it turn gray or dark gray, commonly recognized as the tarnishing of the silver. To provide more contrast or enhance legibility it is a possible to further treat the upper surface of the silver layer 14 to change the gray color to nearly black.

An important feature of the invention is the blackening of the designs and letters once chemicals are used to oxidize the silver area exposed. The trade usually uses liquid sulfur as an oxidizer to blacken the silver. However that color is not a true black. After years of experimenting it has been found that the letters and designs can be made to stand out more and become a true black by adding a second chemical over the silver blackened by the sulfur. The difference is significant. The sulfur alone produces more of a dark Gray. However, the addition of a layer of an extra chemical can help to darken the exposed upper surfaces of the lower layer 14 can protect the inscription and enhance the contrast and legibility of the printed text and/or design. But the result is visibly noticeable and letters stand out more. To optimize or maximize the contrast, a first oxidizer, a sulfur can be used. This first step may be referred to as "sulfur oxidation of silver." This turns it from silver to dark gray. A second step is advantageously adding an additional stronger "liquid oxidizer" on top of the dark gray of the oxidized gray silver. This causes the exposed surfaces of the silver lower layer to change from dark gray to almost pure black making the text and/or designs to stand out more. However, this is an optional step as the gray or dark gray generated by the initial oxidation may be sufficient for some applications.

For example, a 15 mm diameter round by 1 mm thick Gold Overlay plate can be engraved by laser. The gold layer on the top is 0.10 mm thick and the silver layer below it is 0.90 mm thick. For a total of 1.0 mm. By lasering below the depth of the gold of 0.10 thick layer we vaporize the top layer of the gold thus exposing the silver layer below. The particular depth for this sample was lasered at 0.20 mm deep to vaporize the gold and reach the silver layer. The silver exposed area under is clearly silver. This sample was purposely not treated with oxidation to the silver to show the exposed silver below. Once oxidizing chemicals applied to this sample, all the silver exposed areas will turn dark black and the gold will remain, as it doesn't oxidize. After this process the entire piece will be polished on a flat polishing wheel of felt thus creating very precise lettering that is high in contrast between the gold and the black oxidized lasered area. The dark areas around the lettering is due to the dust and smoke from the metal vaporizing and will become crisp and defined after polishing. After the letters are engraved a deeper high powered laser cut at the circumference of the circle at 1 mm deep will cut the piece completely out it can be set with the gem.

The back side of the plate of the charm or pendant etc can be inscribed as follows:
BRAND: Gemexplorer
MINE: Mogok
TREATMENT: Natural
COUNTRY: Burma
YEAR MINED: 1996
CARAT WEIGHT: 2.08 ct
GUBELIN LAB CERT #
GEMCODE #
C.A.T.S. Cert #

This method can be used to permanently mark the surface with critical important information and this can be used to identify various objects, including jewelry bearing gems or other objects that are identified so that they can be traced. Unlike in the prior art that, however, the gems are identified by marking or notating relevant information on the laminate that mounts or supports the precious gem. The gem itself need not be marked since the information that can practically be written onto a very small surface of the gem is limited and even that information can be hidden and, therefore, and accessible once at the gem is mounted on an item of jewelry, such as a pendant, bracelet, ring, earrings and the like.

The method of the invention allows for lettering for jewelry descriptions and designs to be clearly seen without fading. Most laser engraving is done on one metal and the lettering or design is the same color as that of the metal being marked or etched. The use of two metals allows for a black or dark lettering after the oxidation process. This makes the text and/or design more prominent, more permanent and easier to read. This occurs because of the use of two laminated metals that are sandwiched together or otherwise bonded.

By laser engraving silver alone, the laser mark is visible for very short time. As time passes and silver on the surface surrounding the lasered area oxidizes the lasered lettering and it becomes far less visible eventually not being visible at all as the entire piece becomes oxidized (tarnished) to a dark gray or black.

Laser engraving metals which are non oxidizing such as gold, platinum, palladium and non-oxidizing precious metals results in lettering and designs that can be seen only through the difference in the texture of the area being lasered. The lettering is the same color of the metal not a black or dark color which can be easily seen. Because the surrounding metal as well as the lasered area is non oxidizing the result will remain same as time passes.

Use of two laminated metals together creates two layers. The lamination or integration of the layers can be done by either sintering two sheets together, electro forming one metal over the other or by electroplating. One metal is usually an oxidizing metal like silver and the other non-oxidizing. By laser engraving the two sheets the laser eliminates metal by vaporizing it on the surface exposing the metal below. By applying an oxidizing liquid onto the sheet or piece of Jewelry the oxidizing metal turns dark grey or black depending on the nature or degree of treatment. This creates an extreme color difference between the black oxidized surface, which is usually silver, and the non oxidized surface which is usually Gold, platinum group of metals or titanium.

Because CNC technology can also be used to remove the top layer of metal in addition to laser it should be understood that for purposes of this application the specific technology used to selectively remove portions of the upper layer is not critical and any known or conventional technologies can be used to "etch" or remove material from the upper layer. Therefore, the terminologies used such as lasering, chemical or mechanical etching. CNC, etc. are intended to be used interchangeably.

The invention claimed is:

1. A method of marking laminated jewelry, the method comprising:
   forming an item of jewelry of a first metal;
   laminating an external surface of a said first metal with a layer of a second metal, said second metal being more resistant to oxidation than said first metal;
   selectively removing portions of said layer of said second metal to expose corresponding portions of said first metal, said portions forming at least one of text, design, and logo;
   applying a first sulfur oxidizing agent to said exposed portions of said first metal to oxidize said exposed portions and impart a first color to said exposed portions that provides a first contrast to a color of said second metal to enhance the visibility of said at least one of text, design, and logo; and
   applying a second liquid oxidizer to said exposed portions of said first metal to further oxidize said exposed portions and impart a second color to said exposed portions that provides a second contrast to the color of said second metal to further enhance the visibility of said at least one of text, design, and logo,
   wherein said second color is darker than said first color.

2. The method of marking laminated jewelry of claim 1, wherein said first metal is silver and said second metal is gold.

3. An item of jewelry comprising:
   a layer of a first metal;
   a second metal laminated on an external surface of said first metal, said second metal being more resistant to oxidation than said first metal, said second metal having selected portions removed to expose corresponding portions of said first metal, said portions forming at least one of text, design, and logo, said exposed portions of said first metal being oxidized using a first sulfur oxidizing agent to impart a first color to said exposed portions, said exposed portions of said first metal being further oxidized using a second liquid oxidizer to impart a second color to said exposed portions, wherein said second color is darker than said first color and said second color provides enhanced contrast to said second metal.

4. The method of marking laminated jewelry of claim 1, wherein laminating comprises electroplating or electroforming.

5. The method of marking laminated jewelry of claim 1, wherein laminating comprises overlay of said second metal on said first metal.

* * * * *